United States Patent
Sano et al.

(10) Patent No.: US 11,222,563 B2
(45) Date of Patent: Jan. 11, 2022

(54) HANDWRITING SUPPORT DEVICE, HANDWRITING SUPPORT METHOD AND PROGRAM

(71) Applicant: FUJIFILM CORPORATION, Tokyo (JP)

(72) Inventors: Takahiro Sano, Kanagawa (JP); Masayuki Naya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/929,099

(22) Filed: Jul. 14, 2020

(65) Prior Publication Data

US 2020/0342798 A1    Oct. 29, 2020

Related U.S. Application Data

(63) Continuation of application No. PCT/JP2018/042143, filed on Nov. 14, 2018.

(30) Foreign Application Priority Data

Jan. 23, 2018  (JP) .............................. JP2018-008813

(51) Int. Cl.
*G06T 7/70* (2017.01)
*B43L 13/18* (2006.01)
(Continued)

(52) U.S. Cl.
CPC ................ *G09G 3/02* (2013.01); *B43L 13/18* (2013.01); *G02B 27/144* (2013.01); *G06T 7/70* (2017.01);
(Continued)

(58) Field of Classification Search
CPC ........ G09G 3/02; G09G 2354/00; G06T 7/70; G06T 11/00; G06T 2207/30196;
(Continued)

(56) References Cited

U.S. PATENT DOCUMENTS 1,420,491 A    6/1922  Morse
5,751,477 A    5/1998  Tomita et al.
(Continued)

FOREIGN PATENT DOCUMENTS

JP          3009056 U     3/1995
JP       2008-027223 A    2/2008
(Continued)

OTHER PUBLICATIONS

International Search Report issued in International Application No. PCT/JP2018/042143 dated Jan. 29, 2019.
(Continued)

*Primary Examiner* — Mihir K Rayan
(74) *Attorney, Agent, or Firm* — SOLARIS International Property Group, PLLC

(57) ABSTRACT

The handwriting support device includes a beam splitter that reflects light from an image display surface such that a virtual image of an image displayed on the image display surface is visible on a writing surface facing the image display surface and transmits the light from a writing surface side such that the writing surface side is visible, a memory and a processor being configure to perform control for non-display of an image object, which overlaps with a real object on the writing surface and does not overlap with a tip of the writing instrument, among a plurality of image objects in a case where a first image including the plurality of image objects indicating writing target regions is displayed on the image display surface and the real object including the writing instrument is inserted into a space between the beam splitter and the writing surface.

7 Claims, 13 Drawing Sheets

(51) Int. Cl.
　　　*G02B 27/14*　　　(2006.01)
　　　*G09G 3/02*　　　(2006.01)
　　　*G06T 11/00*　　　(2006.01)

(52) U.S. Cl.
　　　CPC .... *G06T 11/00* (2013.01); *G06T 2207/30196* (2013.01); *G09G 2354/00* (2013.01)

(58) Field of Classification Search
　　　CPC ..... B43L 13/18; B43L 13/10; G06K 9/00671; G06K 9/3233; G06K 9/00375; G06F 3/0481
　　　See application file for complete search history.

(56) References Cited

U.S. PATENT DOCUMENTS

| | | | | |
|---|---|---|---|---|
| 9,760,189 | B2* | 9/2017 | Jung | G06F 3/04886 |
| 10,562,337 | B2* | 2/2020 | Naya | B43L 5/00 |
| 10,852,767 | B2* | 12/2020 | Sano | G02B 27/026 |
| 10,864,765 | B2* | 12/2020 | Sano | H05B 47/11 |
| 2007/0052832 | A1* | 3/2007 | Bae | H04N 5/232941 348/333.12 |
| 2009/0174630 | A1* | 7/2009 | Chan | H01L 51/5284 345/76 |
| 2013/0300672 | A1* | 11/2013 | Griffin | G06F 3/04883 345/173 |
| 2015/0348495 | A1* | 12/2015 | Kim | G06F 1/163 345/156 |
| 2017/0320353 | A1* | 11/2017 | Naya | B43L 5/00 |
| 2018/0101223 | A1 | 4/2018 | Ishihara et al. | |

FOREIGN PATENT DOCUMENTS

| | | | | |
|---|---|---|---|---|
| JP | WO2016121362 | * | 8/2016 | ........... B43L 13/026 |
| JP | 2016-194744 A | | 11/2016 | |
| WO | 2016/121362 A1 | | 8/2016 | |

OTHER PUBLICATIONS

Written Opinion of the ISA issued in International Application No. PCT/JP2018/042143 dated Jan. 29, 2019.

* cited by examiner

HANDWRITING SUPPORT DEVICE, HANDWRITING SUPPORT METHOD AND PROGRAM

CROSS-REFERENCE TO RELATED APPLICATIONS

This application is a continuation application of International Application No. PCT/JP2018/042143, filed Nov. 14, 2018, the disclosure of which is incorporated herein by reference in its entirety. Further, this application claims priority from Japanese Patent Application No. 2018-008813, filed Jan. 23, 2018, the disclosure of which is incorporated herein by reference in its entirety.

BACKGROUND OF THE INVENTION

1. Field of the Invention

The present disclosure relates to a handwriting support device, a handwriting support method, and a program that perform a guide for preventing the collapse of lines or balance in a case where characters are written by hand.

2. Description of the Related Art

Currently, an augmented reality (AR) technique is known that adds visual information, such as virtual reality objects, to real space to augment the real world observed by a person. JP2016-194744A (hereinafter referred to as Patent Document 1) discloses a method of displaying and controlling a positional relationship of a real object in a depth direction with respect to a virtual object (hereinafter referred to as an "AR object"). An image display method is disclosed in which, in a case where a hand is in front of the AR object, a shadow of the hand is drawn on the surface of the AR object so that a user can easily recognize how far the AR object is away from his/her hand.

Additionally, JP2008-027223A (hereinafter referred to as Patent Document 2) proposes a technique of making the presence of an AR object close to reality by causing a tactile sense corresponding to a video to be perceived by tracing an object positioned in a video space. Patent Document 2 includes a see-through type head-mounted display, a see-through type display consisting of a display and a half mirror, a projector for projecting a video from the display, and the like, as video presentation unit. In a case where the video presentation unit is in a positional relationship in which the video presentation unit is closer to the eyes than user's fingers touching the object, there is a problem that the video is placed on the fingers and the AR object is perceived in front of the fingers. However, it is disclosed that the problem that the video is displayed on the fingers can be solved by bringing a positional relationship in which the presentation unit is farther from the eyes than the fingers.

Meanwhile, WO2016/121362A (hereinafter referred to as Patent Document 3) proposes a handwriting support system for preventing the collapse of lines or balance in a case where characters are written in a document or the like that needs to be handwritten. The device of Patent Document 3 uses an AR technique and is configured to reflect a mirror image of a model image displayed on an image display surface with a half mirror and cause a user to visually recognize a reflected image (virtual image) so as to coincide with a writing surface.

SUMMARY OF THE INVENTION

However, in the handwriting support device of Patent Document 3, the virtual image that should be under the user's hand in a case of writing is displayed to overlap with the hand. Therefore, there is a case where a problem occurs in depth perception and the user feels strong discomfort in a case of writing. Human depth perception is obtained on the basis of two types of visual information: binocular and monocular. In the configuration in which the virtual image (AR object) using the half mirror is projected on the writing surface, it is determined from the "binocular parallax" that the AR object is present behind the hand. On the other hand, in reality, since the AR object overlaps with the hand that is the real object and is visually recognized through the hand, it is determined that the AR object is present in front of the hand by the "monocular shielding effect". Since the user simultaneously acquires visual information from the binocular and monocular, the user feels a strong discomfort due to a shift in information.

The present disclosure has been made in view of the above circumstances, and an object of the present disclosure is to provide a handwriting support device, a handwriting support method, and a program that can reduce discomfort felt by a user during use and improve a handwriting support function.

A handwriting support device of the present disclosure comprises a beam splitter that reflects light from an image display surface such that a virtual image of an image displayed on the image display surface is visible on a writing surface facing the image display surface and transmits the light from a writing surface side such that the writing surface side is visible, and that is disposed with a space between the beam splitter and the writing surface; and an image display control unit that performs control for non-display of an image object, which overlaps with a real object on the writing surface and does not overlap with a tip of the writing instrument, among a plurality of image objects in a case where a first image including the plurality of image objects indicating writing target regions is displayed on the image display surface and the real object including the writing instrument is inserted into the space between the beam splitter and the writing surface.

The handwriting support device of the present disclosure may further comprise an object position sensor that acquires image data of the real object on the writing surface, and the image display control unit may specify the image object to be non-displayed, based on coordinate information of the real object on the writing surface that is obtained from the image data acquired by the object position sensor and coordinate information of each image object provided in advance.

In the handwriting support device according to the present disclosure, in a case where the real object is the writing instrument and a hand of a user that holds the writing instrument, the image display control unit may specify the image object to be non-displayed, based on information indicating left and right of the hand of the user and a tip position of the writing instrument, which is specified from the coordinate information of the real object on the writing surface, and the coordinate information of each image object.

The handwriting support device of the present disclosure may further comprise a dominant hand information receiving unit that receives dominant hand information from a user, and in a case where the real object is the writing instrument and a hand of the user that holds the writing instrument, the image display control unit may specify the image object to be non-displayed, based on information indicating a tip position of the writing instrument, which is specified based on the dominant hand information and the coordinate information of the real object on the writing surface, and the coordinate information of each image object.

In the handwriting support device of the present disclosure, the image display control unit may acquire position coordinates of an upper end, a lower end, a left end and/or a right end of a projection region of the real object on the writing surface, as the coordinate information of the real object on the writing surface, specify an image object, having a lower end below the upper end of the projection region of the real object on the writing surface and having a left end on a right side of the tip position of the writing instrument, as the image object to be non-displayed, in a case where the hand of the user is a right hand, and specify an image object, having a lower end below the upper end of the projection region of the real object on the writing surface and having a right end on a left side of the tip position, as the image object to be non-displayed, in a case where the hand of the user is a left hand.

Here, up, down, left, and right are defined by up, down, left, and right of the writing surface as the writing surface is viewed from the user.

In the handwriting support device of the present disclosure, the image display control unit may set the left end of the projection region of the real object as the tip position of the writing instrument in a case where the hand of the user is a right hand, and set the right end of the projection region of the real object as the tip position of the writing instrument in a case where the hand of the user is a left hand.

In the handwriting support device according to the present disclosure, the image display control unit may display a second image that is different from the first image on the image display surface so as to overlap with the first image.

In the handwriting support device according to the present disclosure, the image display control unit may display, as the second image, information related to an image object which overlaps with the tip of the writing instrument on a display region of the image object to be non-displayed of the first image.

A handwriting support method of the present disclosure may cause a first image, which is visually recognized as a virtual image on a writing surface and includes a plurality of image objects indicating writing target regions, to be displayed on an image display surface, and cause an image object, which overlaps with a real object on the writing surface and does not overlap with a tip of a writing instrument, among the plurality of image objects, to be non-displayed in a case where the real object including the writing instrument is inserted into a space between the writing surface and the image display surface.

A program of the present disclosure is a program for causing a computer to realize the handwriting support method of the present disclosure.

According to the handwriting support device of the present disclosure, the image display control unit performs a control for non-display of an image object, which overlaps with a real object on the writing surface and does not overlap with a tip of the writing instrument, among a plurality of image objects in a case where a first image including the plurality of image objects indicating writing target regions is displayed on the image display surface and the real object including the writing instrument is inserted into a space between the beam splitter and the writing surface. According to such a configuration, it is possible to suppress that the virtual image is overlappingly displayed on the user's hand holding the writing instrument. Therefore, the discomfort felt by the user regarding the positional information between the virtual image and the position of the hand can be reduced. Hence, a handwriting support function can be improved.

DESCRIPTION OF THE PREFERRED EMBODIMENTS

Hereinafter, embodiments of the present invention will be described with reference to the drawings.

Figure 1:
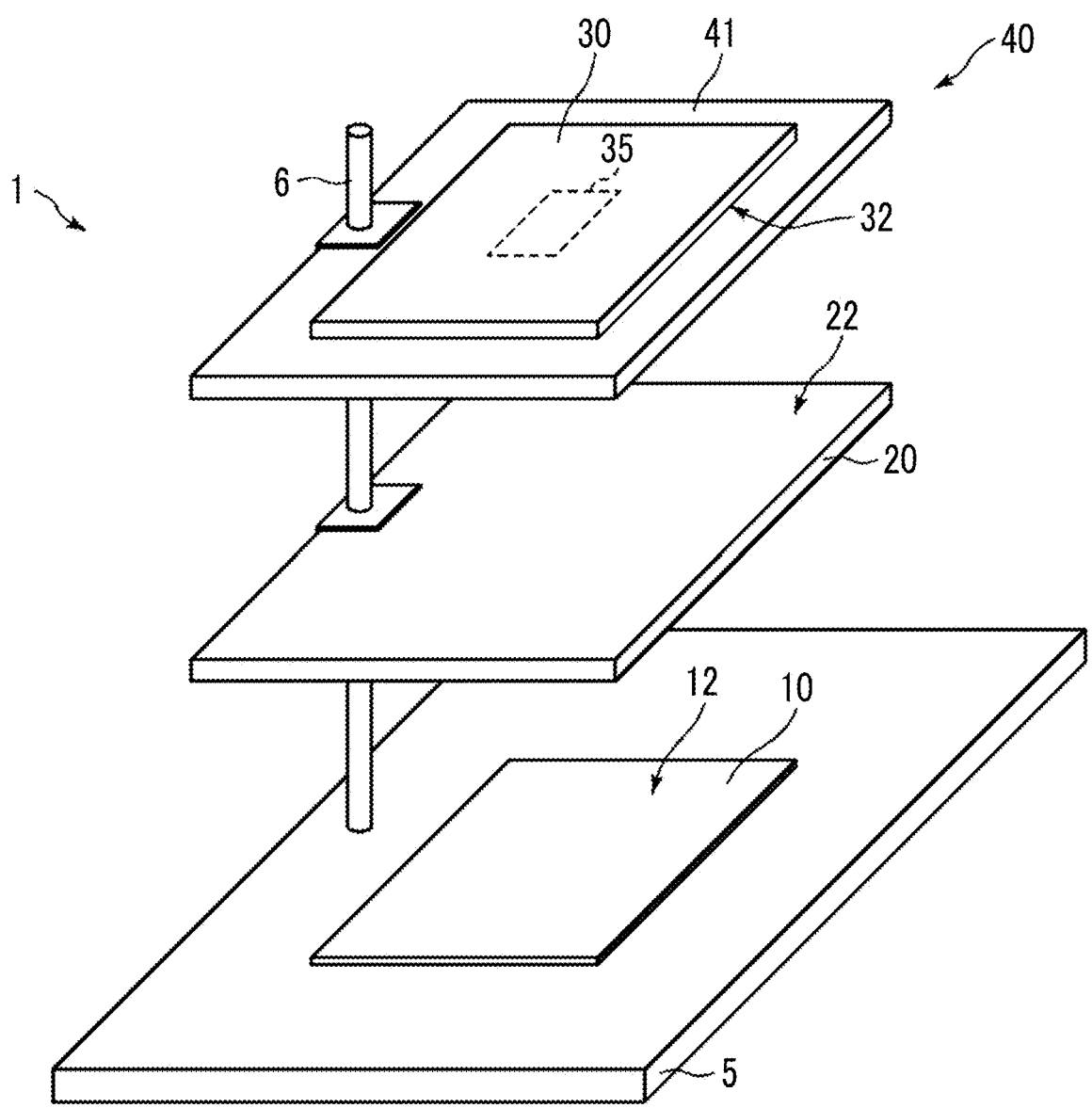
FIG. 1 is a perspective view illustrating a schematic configuration of a handwriting support device according to an embodiment of the present invention.
Figure 2:
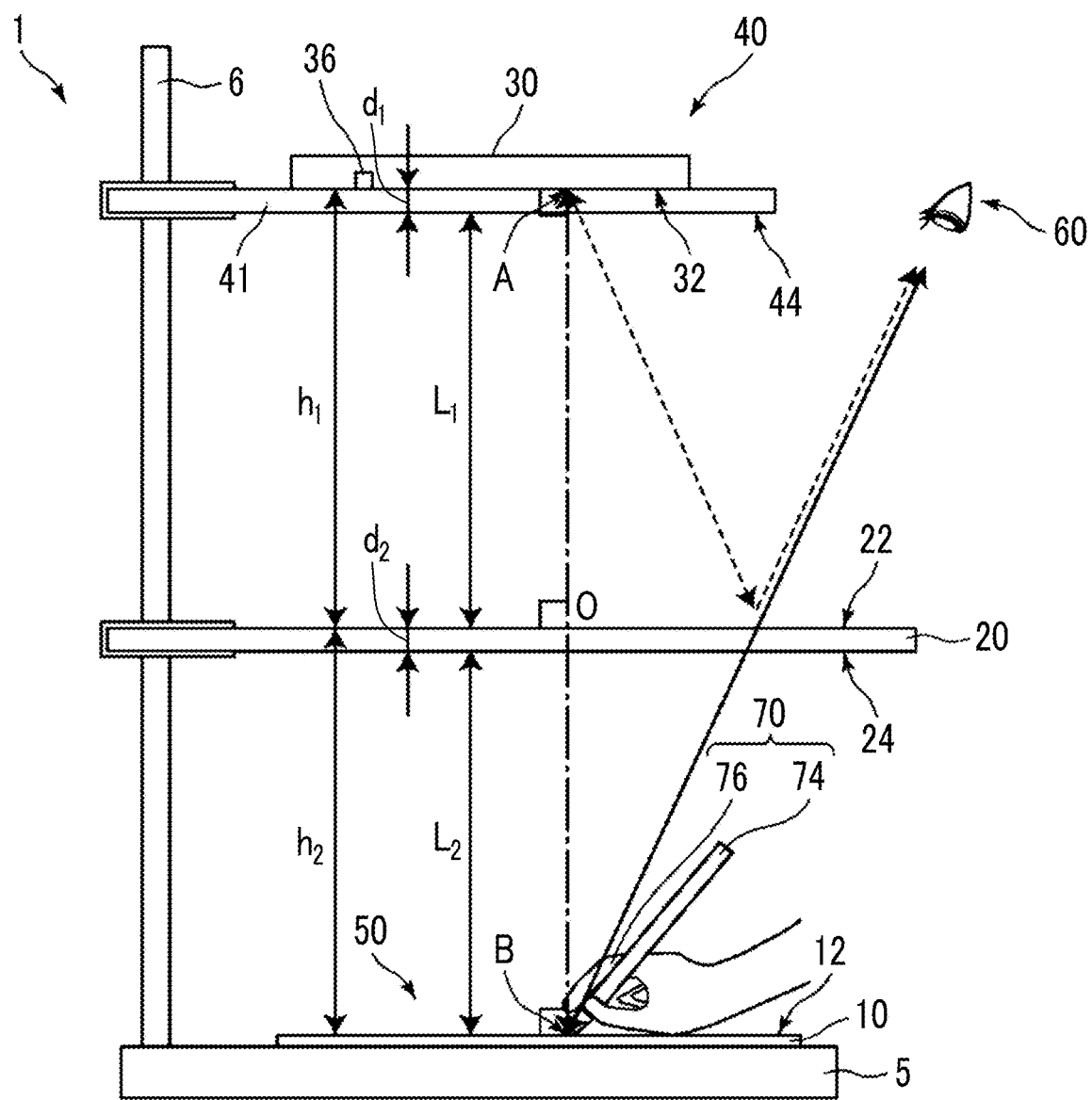
FIG. 2 is a side view illustrating a schematic configuration of the handwriting support device illustrated in FIG. 1.

FIG. 1 is a perspective view of a schematic configuration of a handwriting support device according to an embodiment of the present invention, and FIG. 2 is a side view illustrating a positional relationship among a writing surface, a mirror surface of a half mirror that is a form of a beam splitter, and an image display surface, in the handwriting support device 1 of the present embodiment.

As illustrated in FIGS. 1 and 2, the handwriting support device 1 of the present embodiment comprises a half mirror 20 that reflects light from an image display surface 32 such that a virtual image of an image displayed on the image display surface 32 is visible on a writing surface 12 facing the image display surface 32 and that transmits the light from the writing surface 12 side and is disposed with a space from the writing surface 12 such that the writing surface 12 is visible; and an image display control unit 35 that performs a control for non-display of an image object, which overlaps with a real object 70 on the writing surface 12 and does not overlap with a tip of the writing instrument 74, among a plurality of image objects in a case where a first image including the plurality of image objects indicating writing target regions is displayed on the image display surface 32 and the real object 70 including the writing instrument 74 is inserted into the space between the half mirror 20 and the writing surface 12.

The handwriting support device 1 of the present embodiment comprises a support base 5 on which a writing medium 10 is placed, and a support shaft 6 for positioning the half mirror 20 and a support member 40 of an image presentation body 30 on the support base 5. It is preferable that the half mirror 20 and the support member 40 are configured so as to be movable upward and downward along the support shaft 6. The image presentation body 30 having the image display surface 32 is supported by the support member 40 such that the image display surface 32 faces a mirror surface 22 of the half mirror 20. The support member 40 comprises a supporting plate 41 on which the image presentation body 30 is placed. The supporting plate 41 has transparency that allows an image displayed on the image display surface 32 of the image presentation body 30 to be copied to the mirror surface 22.

In the handwriting support device 1, the half mirror 20 is disposed between the image display surface 32 and the writing surface 12 located to face the image display surface 32. By virtue of the present configuration, in the handwriting support device 1, the virtual image of the image displayed on the image display surface 32 is displayed onto the writing surface 12 in a visually recognizable manner. The writing surface 12 is a surface that faces the image display surface 32, and is a surface on which the virtual image of the image displayed on the image display surface 32 is visually recognized. In addition, in the following, a surface of the writing medium 10, such as paper, which is placed on a surface on which the virtual image is visually recognized and on which the user writes characters, pictures, or the like in a case where the handwriting support device 1 is used, will be described as being regarded as the writing surface 12.

In the present embodiment, the positions of the half mirror 20, the image display surface 32, and the writing surface 12 are adjusted such that an optical distance between the writing surface 12 and the mirror surface 22 is equal to an optical distance between the mirror surface 22 and the image display surface 32. However, the invention is not limited to the present configuration as long as the virtual image reflected in the half mirror 20 can be visually recognized on the writing surface 12 with a desired size. The image display surface 32 is constituted of, for example, a panel surface of the image presentation body 30, such as a display or a tablet computer and a smart phone comprising the display.

Figure 3:
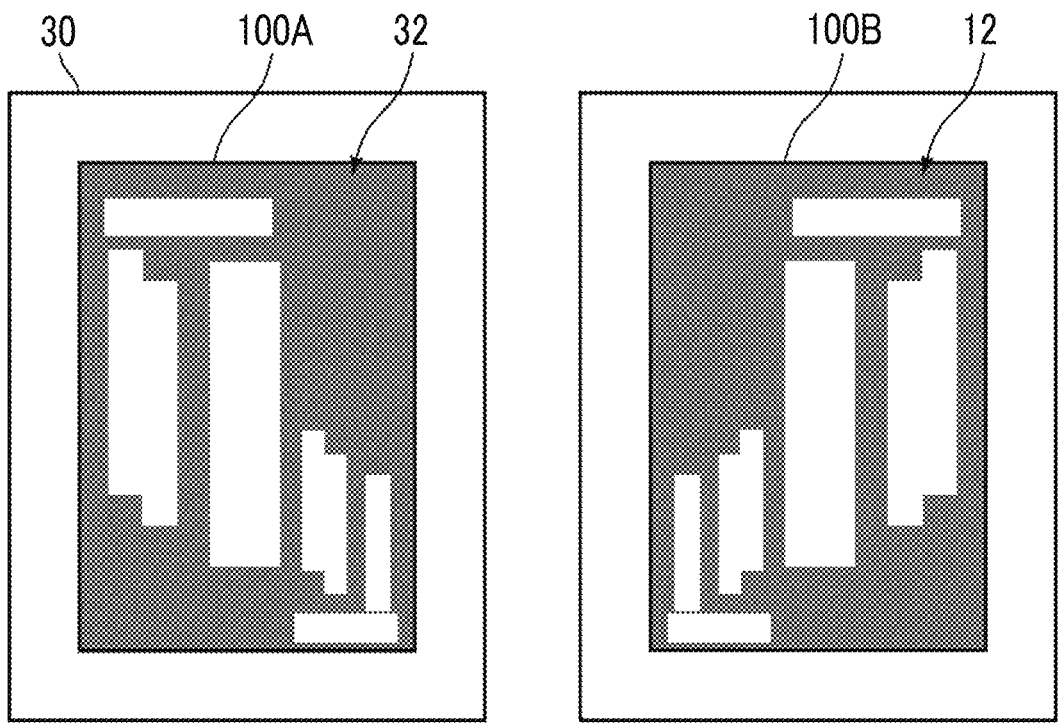
FIG. 3 is a schematic view illustrating images displayed on an image display surface and a writing surface.

A left figure of FIG. 3 is a first image 100A displayed on the image display surface 32 of the image presentation body 30, and a right figure is a reflected image (virtual image) 100B of the first image 100A viewed onto the writing surface 12. As illustrated in FIG. 3, the first image 100A, which is a mirror image of the image 100B (left-right inverted image) to be displayed on the writing surface 12, is displayed on the image display surface 32. The image 100B exemplified herein is a layout image of a region where an address, a destination, and the like of a cover of a postcard should be written.

As illustrated in FIG. 2, in a case where the user views the writing surface 12 from an observation unit 60 on the mirror surface 22 side of the half mirror 20, the reflected image (virtual image) 100B obtained by the first image 100A displayed on the image display surface 32 being reflected by the mirror surface 22 and being visually recognized appears to coincide with the writing surface 12. That is, in the present specification, "the virtual image is displayed on the writing surface" means a state where the image is seen as if the image is directly projected onto the writing surface 12. However, actually, the user sees the virtual image of the mirror image reflected by the mirror surface 22, and the image is not directly projected and displayed unlike the display of an image by a projector.

The half mirror 20 comprises the mirror surface 22 that faces the image display surface 32. The half mirror 20 only needs to reflect the light from the image display surface 32 and transmit the light from the writing surface side, and the half mirror 20 exhibits its function as long as the half mirror reflects part of the light incident on the mirror surface 22 and transmits a part of the light. As illustrated in FIG. 2, a half mirror may be adopted that allows the writing surface 12 to be visually recognized from the observation unit 60 and that has the reflectivity and the transmittance such that the mirror image (the image to be displayed originally) of the mirror image that is reflected by the half mirror 20 and displayed on the image display surface 32 can be overlappingly and visually recognized on the writing surface 12. That is, in the present specification, the half mirror 20 only needs to reflect the light from the image display surface such that the virtual image coincides with the writing surface and is visually recognized, and the transmittance and the reflectivity are not limited to 1:1.

In the present embodiment, the mirror surface 22 of the half mirror 20 is a surface on the image presentation body 30 side and is positioned such that the writing surface 12, the mirror surface 22, and the image display surface 32 are parallel to each other and an optical distance $h_1$ between the image display surface 32 and the mirror surface 22 and an optical distance $h_2$ between the mirror surface 22 and the writing surface 12 are equal to each other. That is, the optical distance $h_1$ from an optional point O of the mirror surface 22 to an intersection point A between a perpendicular line intersecting the mirror surface 22 at right angles through this optional point O and the image display surface 32, and the optical distance $h_2$ from the optional point O to an intersection point B between the same perpendicular line and the writing surface 12 are equal to each other.

In the present configuration, the optical distance h1 between the image display surface 32 and the mirror surface 22 is expressed by a sum of a product $n_1 \cdot d_1$ of a thickness $d_1$ and a refractive index $n_1$ of the supporting plate 41, and a distance $L_1$ between a lower surface 44 of the supporting plate 41 and the mirror surface 22, that is, $h_1 = n_1 \cdot d_1 + L_1$. Additionally, the optical distance $h_2$ between the mirror surface 22 and the writing surface 12 is expressed by a sum of a product $n_2 \cdot d_2$ of a thickness $d_2$ of the half mirror 20, and a refractive index $n_2$, and a distance $L_2$ between a lower surface 24 of the half mirror 20 and the writing surface 12, that is, $h_2 = n_2 \cdot d_2 + L_2$.

In this way, in the handwriting support device 1 of the present embodiment, the virtual image of the image displayed on the image display surface 32 can be visibly displayed on the writing surface 12 by the position of the half mirror 20 and the position of the image presentation body 30 being adjusted such that the optical distances $h_1$ and $h_2$ are equal to each other.

The image display control unit 35 has a function of controlling the display of an image onto the image display surface 32. The image display control unit 35 executes a handwriting support method of causing the first image 100A, which is visually recognized as the virtual image on the writing surface 12 and includes the plurality of image objects $Ob_n$ (n=1, 2, . . . ) indicating the writing target regions, to be displayed on the image display surface 32, and causing an image object, which overlaps with the real object 70 on the writing surface 12 and does not overlap with the tip of the writing instrument 74, among the plurality of image objects, to be non-displayed in a case where the real object 70 including the writing instrument 74 is inserted into the space between the writing surface 12 and the image display surface 32.

Here, as the real object 70 including the writing instrument 74 inserted into the space between the writing surface 12 and the half mirror 20, the writing instrument 74 and a hand 76 of the user holding the writing instrument 74 is mainly assumed.

The image display control unit 35 is mounted on a computer comprising well-known hardware components, such as a central processing unit (CPU), a main storage device, an auxiliary storage device, an input/output interface, and a communication interface. The computer has installed therein a handwriting support program for realizing the above-described handwriting support method, and functions as the image display control unit 35 by executing the program.

In addition, the handwriting support program is recorded in on a recording medium such as a digital versatile disc (DVD) or a compact disc read-only memory (CD-ROM) and distributed, and is installed in the computer from the recording medium. Alternatively, the handwriting support program is stored in a storage device of a server computer connected to a network or in a network storage in a state where the program can be accessed from the outside, and is downloaded and installed to the computer depending on a request of an installer who installs the handwriting support device or the user of the handwriting support device. The handwriting support program can be provided as application software for causing the computer to function as the image display control unit for the handwriting support device.

Figure 4:
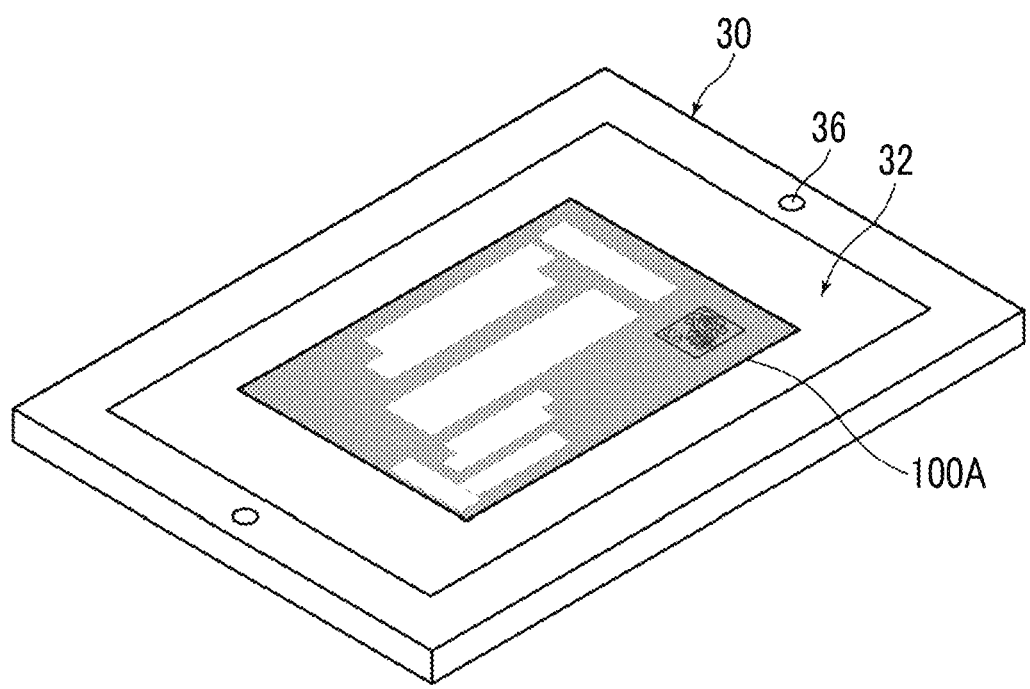
FIG. 4 is a perspective view illustrating a tablet computer that realizes an image display control unit.

In the present embodiment, for example, a tablet computer as illustrated in FIG. 4 can be applied as the image presentation body 30 comprising the image display surface 32. The tablet computer comprises a display constituting the image display surface 32, and an in-camera (hereinafter, also referred to as an in-camera 36) that is provided in the same surface as the display and functions as the object position sensor 36.

Figure 5:
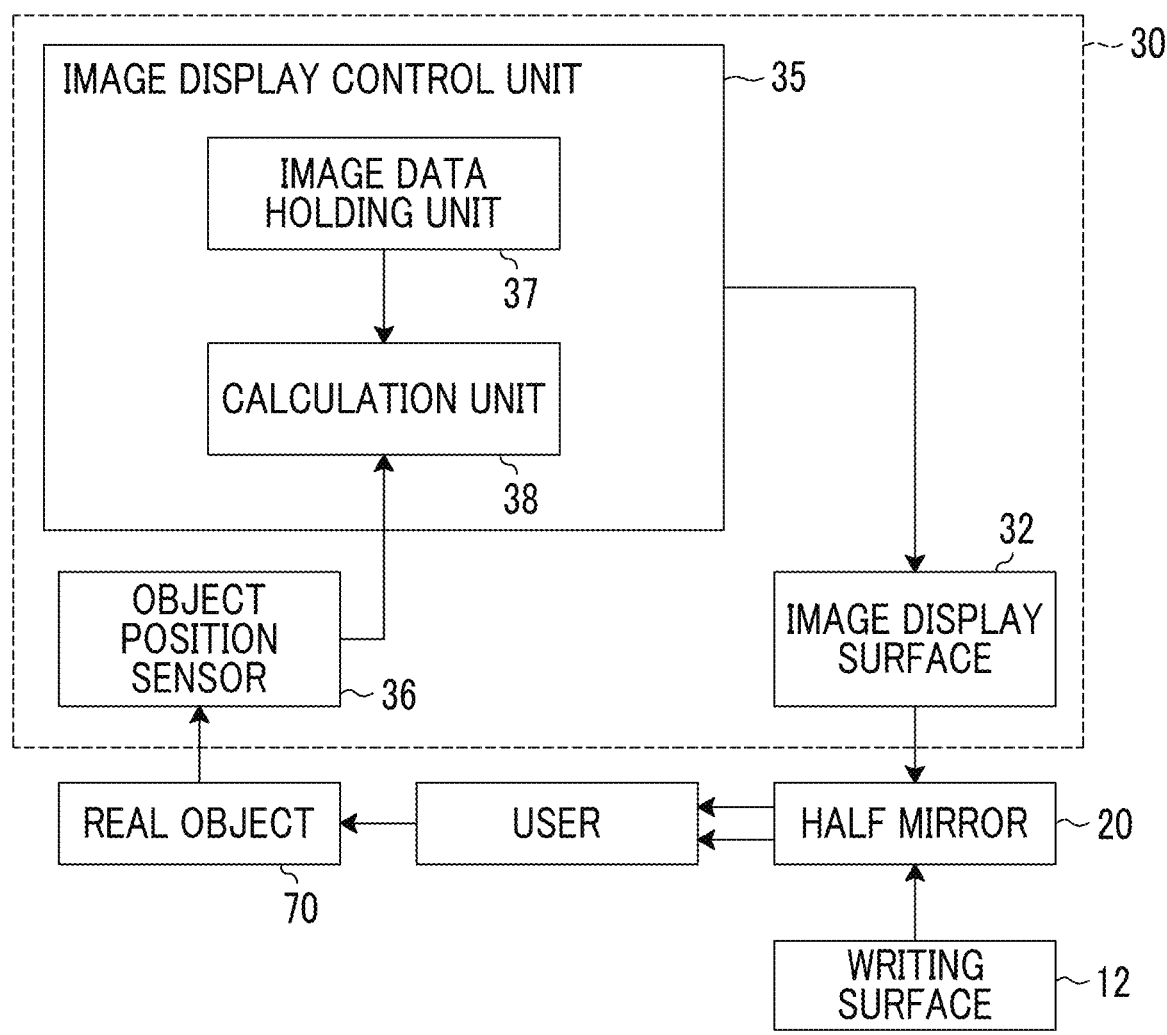
FIG. 5 is a block diagram schematically illustrating a relationship between the image display control unit and other components constituting the handwriting support device of the present embodiment.

FIG. 5 is a block diagram schematically illustrating a relationship between the image display control unit 35 and other components that constitute the handwriting support device 1 of the present embodiment. The image display control unit 35 comprises an image data holding unit 37 that holds image data of a mirror image of an image to be displayed on the writing surface 12, and a calculation unit 38 that performs the calculation processing of specifying an image object to be non-displayed.

The object position sensor 36 is not limited to the in-camera provided in the tablet computer, but may be a camera, an infrared sensor, an ultrasonic sensor, or the like, which is provided in a part of the support member 40 or the like.

The image data holding unit 37 is a storage unit that stores image data of the first image. The image data holding unit 37 holds, as the first image, image data such as various layout images in addition to a layout image for a postcard, and can be configured such that appropriate image data is read out to the calculation unit 38 depending on the writing medium. Additionally, the image data holding unit 37 holds coordinate information of a plurality of writing target image objects included in the first image.

The user visually recognizes the image displayed on the image display surface 32 and the writing surface 12 via the half mirror 20. The real object 70 is the hand 76 of the user and the writing instrument 74, and is moved by the user. In a case where the real object 70 is inserted between the half mirror 20 and the writing surface 12, the object position sensor 36 detects this insertion and acquires image data of the real object 70 on the writing surface 12. Additionally, the object position sensor 36 may be set to detect the movement of the hand 76 and to acquire the image data of the real object at a preset timing, such as always or at regular time intervals.

An image object to be non-displayed is specified in the calculation unit 38 of the image display control unit 35 on the basis of the coordinate information, on the writing surface 12, of the real object 70 obtained from the image data acquired by the object position sensor 36 and the coordinate information of each image object provided in advance in the image data holding unit 37, and the image display control unit 35 displays a mirror image of an image in which the image object is not displayed, on the image display surface 32.

In this case, the calculation unit 38 of the image display control unit 35 performs a calculation for obtaining the coordinate information of the real object 70 on the writing surface 12 from the image data acquired by the object position sensor 36. In addition, in a case where the object position sensor 36 further comprises a calculation unit, the object position sensor 36 may be configured to obtain the coordinate information of the real object and transmit the coordinate information to the image display control unit 35.

Examples of the coordinate information of the real object include position coordinates of an upper end, a lower end, a left end, and a right end of the projection region of the real object on the writing surface. Although all the position coordinates of the upper, lower, left, and right ends of the projection region may be acquired, it is sufficient to find minimum necessary coordinate information for specifying an image object to be non-displayed.

Here, an image to be displayed on the writing surface will be described with reference to FIGS. 6 and 7. In the following, the writing surface 12 is the surface of the postcard 10, and the image to be displayed on the writing surface 12 is a layout image 100 for the postcard. The layout image 100 includes image objects $Ob_1$ to $Ob_8$ in which entry regions such as an address and a recipient name indicate writing target regions, respectively. As already described, the mirror image of the layout image 100 visually recognized the writing surface 12 is displayed on the image display surface 32. However, in order to facilitate visual understanding, in the drawings after FIG. 6, the layout image 100 visually recognized on the writing surface will be illustrated and described.

Figure 6:
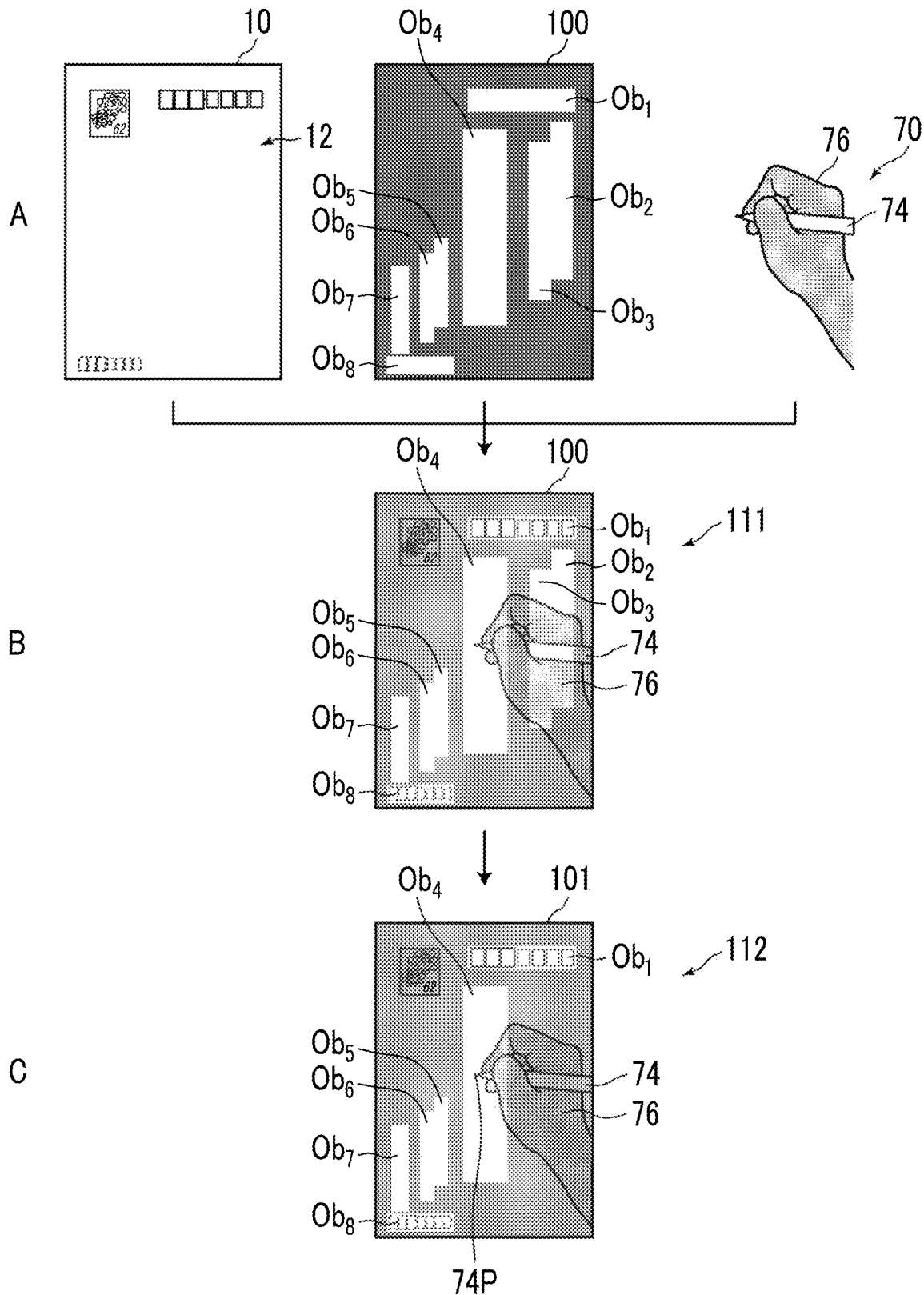
FIG. 6 is a view for explaining an image displayed on the handwriting support device of the present embodiment and a state visually recognized by a user.
Figure 7:
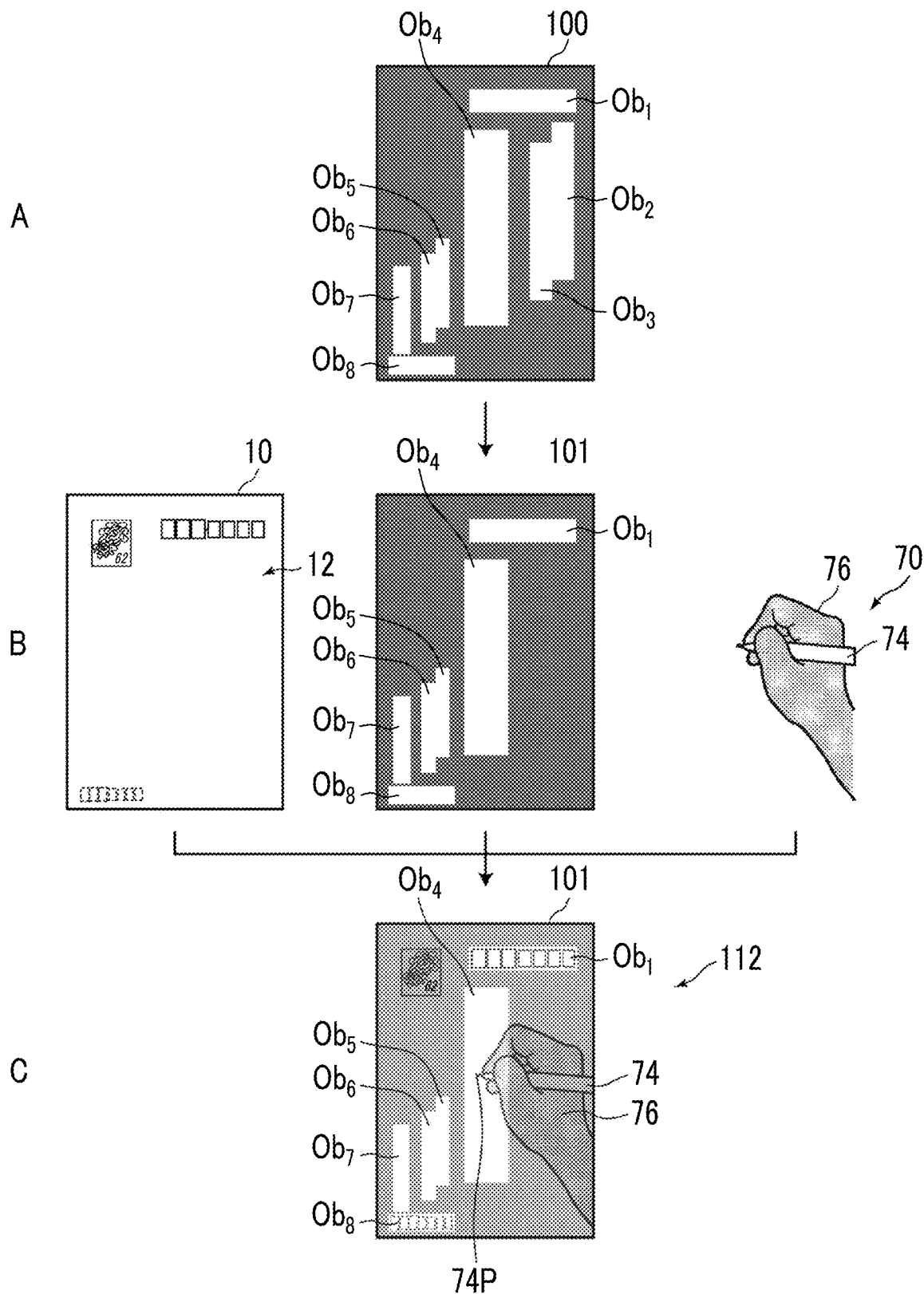
FIG. 7 is a view for explaining a non-display processed image.

As illustrated in FIG. 6A, a case where the real object 70 including the writing instrument 74 is inserted into the space between the writing surface 12 and the half mirror in a case where the layout image 100 is displayed on the writing surface 12 of the postcard 10 will be described. In this case, in a case where the user views the writing surface 12, a part of each of the image objects $Ob_2$, $Ob_3$, and $Ob_4$ appears to overlap with the hand 76 and the writing instrument 74. As illustrated in FIG. 6B, in a case where the image objects $Ob_2$ to $Ob^4$ that should be seen to coincide with the writing surface 12 are viewed on the surface of the hand or the writing instrument, the user feels a strong sense of discomfort due to the sense of depth between the writing surface and the image. For that reason, as illustrated in C of FIG. 6, the image display control unit 35 performs the control of not displaying the image objects $Ob_2$ and $Ob_3$ other than the image object $Ob_4$ overlapping with the tip 74P of the writing instrument among the image objects $Ob_2$, $Ob_3$, and $Ob_4$ displayed to overlap with the hand 76 and the writing instrument 74.

A non-display processed image 101 in which the image objects $Ob_2$ and $Ob_3$ that overlap with the real object 70 and do not overlap with the tip 74P of the writing instrument 74 is not displayed from the original layout image 100 illustrated in FIG. 7A. Then, in a case where the non-display processed image 101 is displayed on the writing surface 12, a visual field image 112 illustrated in FIG. 7C (C of FIG. 6) is obtained.

In a case where the image objects $Ob_2$ and $Ob_3$ are not displayed as illustrated in FIG. 7C, the region of the image object that is viewed to overlap with the hand is reduced. Therefore, the user's discomfort sense can be reduced and the natural sense of use can be given to the user.

An example of a method of specifying an image object to be non-displayed in the image display control unit 35 will be described.

Figure 8:
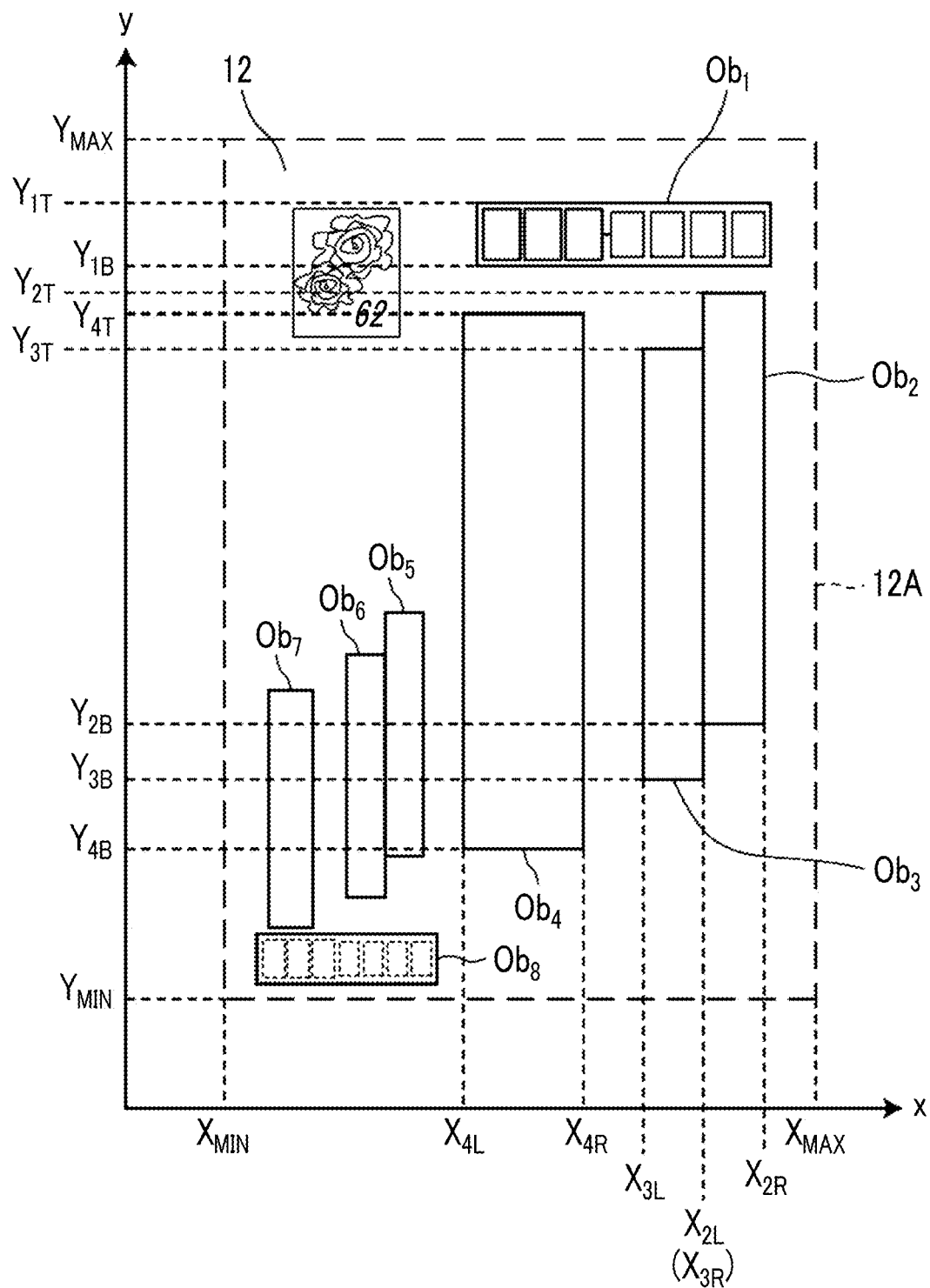
FIG. 8 is a view illustrating definitions of position coordinates of a display region and an image object for explaining a method of specifying the image object to be non-displayed.

FIG. 8 is a view for explaining the coordinate definition of a writing region 12A of the writing surface 12. As illustrated in FIG. 8, the writing surface 12 is represented by an xy plane. In the xy plane, in a case where the user views the writing surface during use, an x axis is defined on the left and right, a y axis is defined up and down, a right direction of the left and right directions is defined as being positive on the x axis, and an up direction of the up and down directions is defined as being positive on the y axis. Also, the y coordinate of an upper end of the writing region 12A is defined as $Y_{MAX}$, the y coordinate of a lower end thereof is defined as $Y_{MIN}$, the x coordinate of a left end thereof is defined as $X_{MIN}$, and the x coordinate of a right end thereof is defined as $X_{MAX}$.

The image data holding unit 38 of the image display control unit 35 holds, in advance, as coordinate information of the respective image objects $Ob_n$ (n=1, 2, ..., and 8) included in the first image 100 displayed on the writing surface 12, the position coordinates of upper and lower ends and left and right ends (y coordinates $Y_{nT}$ of upper ends, y coordinates $Y_{nB}$ of lower ends, x coordinates $X_{nL}$ of left ends, and x coordinates $X_{nR}$ of right ends) of the respective image objects $Ob_n$ in the xy plane illustrated in FIG. 8.

Figure 9:
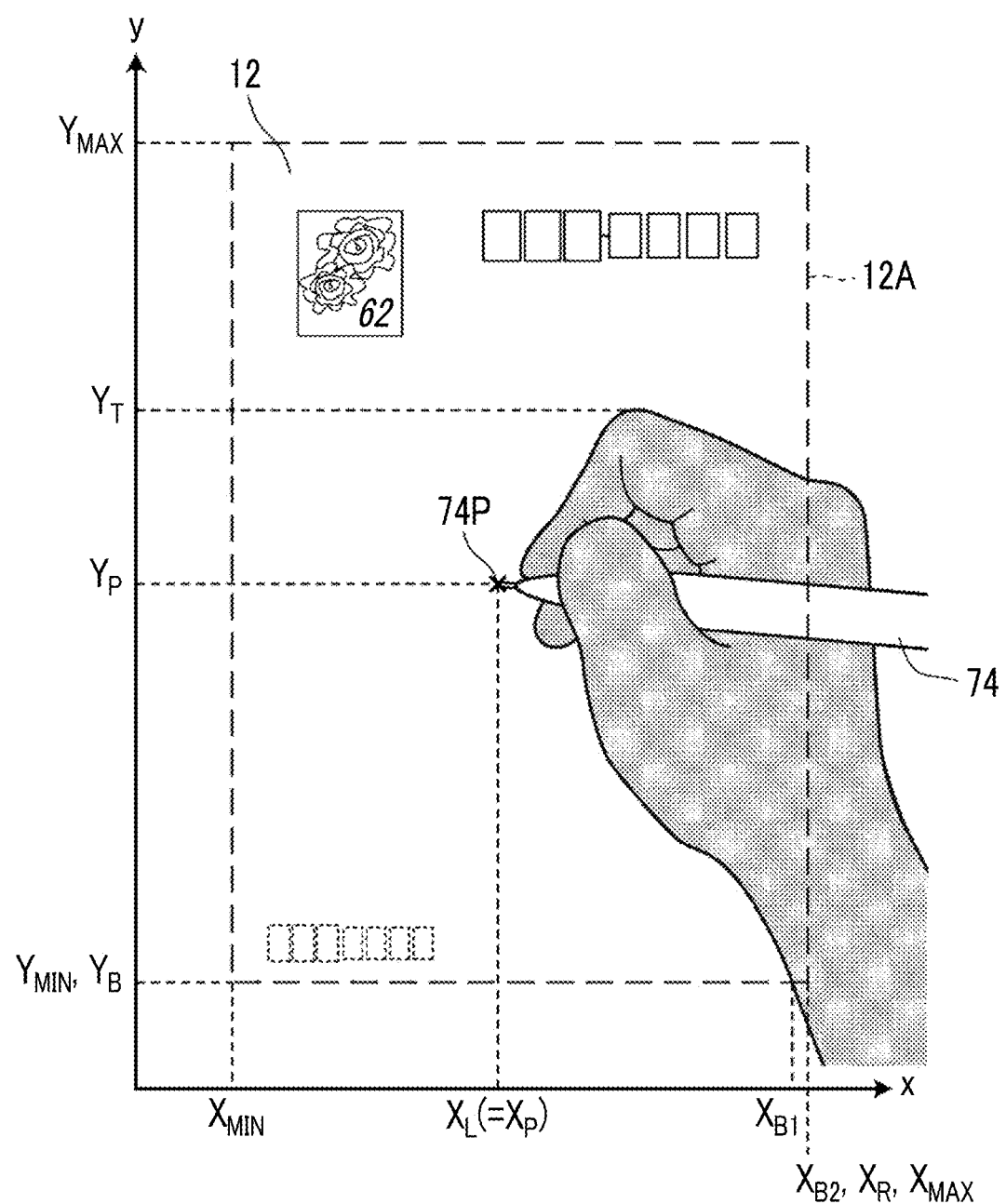
FIG. 9 is a view illustrating information on upper and lower ends and left and right ends of a projection region, on the writing surface, of a real object for explaining the method of specifying the non-displayed image object.

FIG. 9 is a view for explaining the coordinates of the upper and lower ends and the left and right ends of the projection region of the real object 70 on the writing surface 12. Here, the projection region is a region where the real object 70 is vertically projected on the writing surface 12. From the image data, the projection region is obtained and the coordinate information of the upper end, the lower end, the left end, and the right end of the projection region is acquired. However, in this case, the y coordinate of the upper end is defined as $Y_T$, the y coordinate of the lower end is defined as $Y_B$, the x coordinate of the left end is defined as $X_L$, the x coordinate of the right end is defined as $X_R$. In addition, as illustrated in FIG. 9, in a case where the lower end $Y_B$ of the projection region coincides with the lower end $Y_{MIN}$ of the writing region 12A, and the projection region overlaps with the lower end $Y_{MIN}$ of the writing region 12A with a width in the X direction, the x coordinate of a left end of the lower end $Y_B$ is defined as $X_{B1}$, and the x coordinate of a right end of the lower end $Y_B$ is defined as $X_{B2}$.

Display and non-display are determined for each image object on the basis of a coordinate system defined in FIGS. 8 and 9. In this case, after information indicating the left and right of the hand and the tip position of the writing instrument is specified, display and non-display of each image object is specified on the basis of the information and the coordinate information of each image object.

Figure 10:
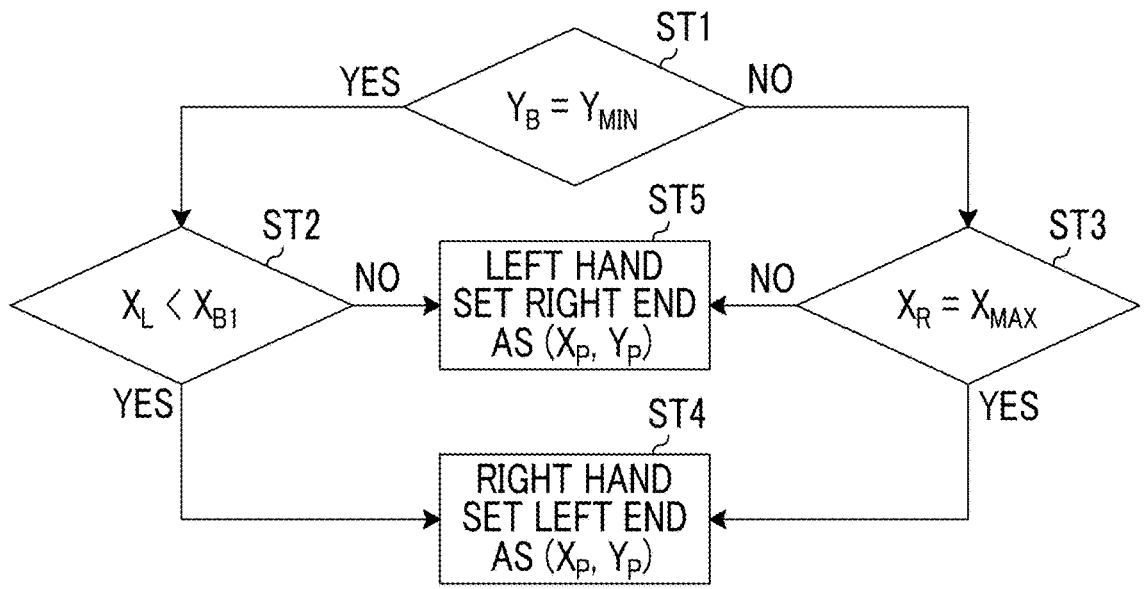
FIG. 10 is a view illustrating a flow for specifying the left and right of hands that hold a writing instrument.

FIG. 10 is a view illustrating a flow of specifying the left and right sides of the hand, that is, whether the hand holding the writing instrument is the left hand or the right hand, and specifying the tip position of the writing instrument.

First, it is determined whether or not the lower end $Y_B$ of the projection region of the real object coincides with the lower end $Y_{MIN}$ of the writing region 12A (ST1).

In a case where $Y_B=Y_{MIN}$ is satisfied (ST1: YES), it is determined whether or not the left end $X_L$ of the projection region of the real object is smaller than the left end $X_{B1}$ of the lower end $Y_B$ of the projection region of the real object (ST2). Here, in a case where $X_L<X_{B1}$ is satisfied (ST2: YES), it is determined that the hand holding the writing instrument is the right hand, and in this case, the position of the left end is set as a tip position $(X_P, Y_P)$ of the writing instrument (ST4). On the other hand, in a case where $X_L<X_{B1}$ is not satisfied (ST2: NO), the left hand is determined, and in this case, the position of the left end is set as the tip position $(X_P, Y_P)$ of the writing instrument (ST5).

In a case where $Y_B$ is not $Y_{MIN}$ (ST1: NO), it is determined whether or not the right end $X_R$ of the projection region of the real object is the right end $X_{MAX}$ of the projection region (ST3). Here, in a case where $X_R=X_{MAX}$ (ST3: YES), it is determined that the hand holding the writing instrument is the right hand, and in this case, the position of the left end is set as the tip position $(X_P, Y_P)$ of the writing instrument (ST4). In a case where $X_R$ is not $X_{MAX}$ (ST3: NO), the left hand is determined, and in this case, the position of the left end is set as the tip position $(X_P, Y_P)$ of the writing instrument (ST5).

According to the above flow, the position coordinates $(X_P, Y_P)$ of the left and right of the hand 76 and the tip 74P of the writing instrument 74 are specified. In the following, the hand holding the writing instrument is referred to as a dominant hand.

In addition, the method of specifying the tip position of the writing instrument from the image data of the real object is not limited to the above method, and may be a method of detecting a tapered region or a linear region from the projection region and specifying the region as the tip position. Moreover, the tip of the writing instrument can be specified from the projection region, and the left and right of the hand can be specified depending on which of the left and right of the projection region extends to.

Figure 11:
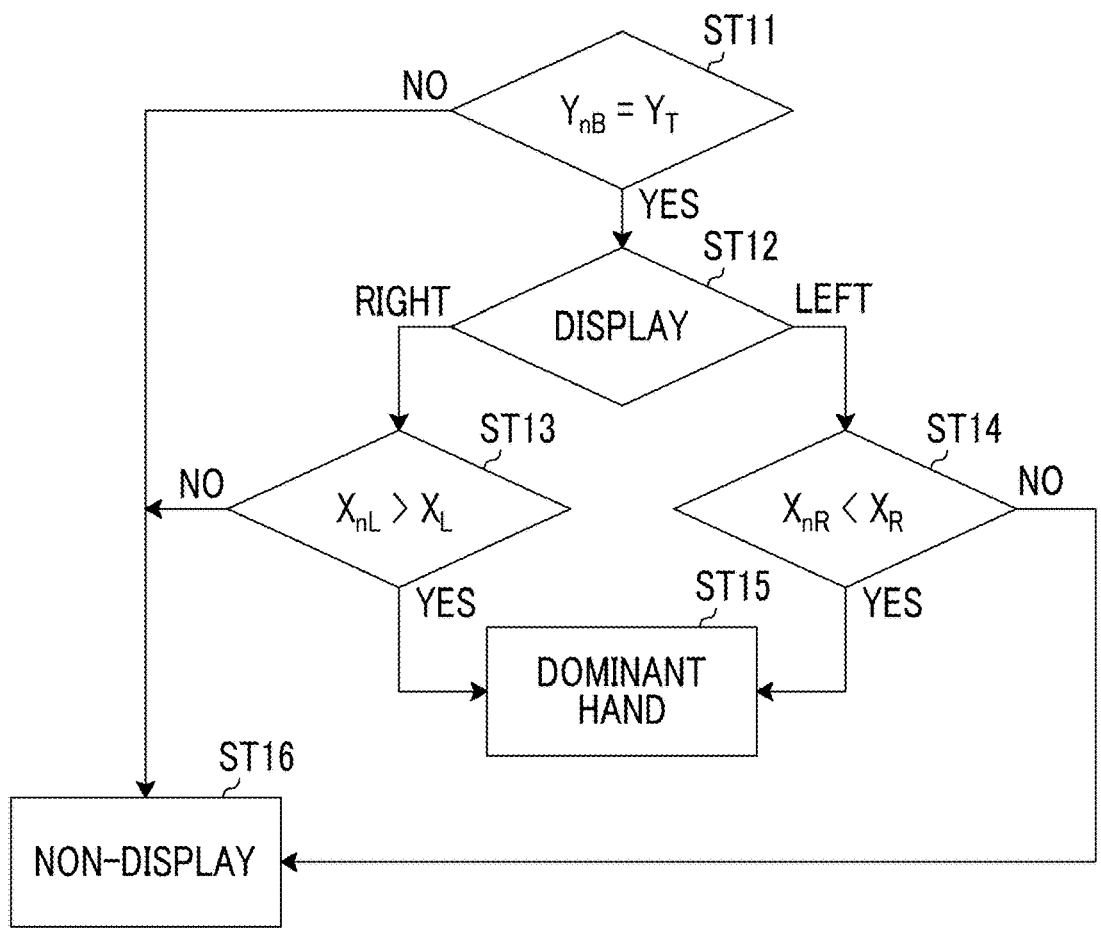
FIG. 11 is a view illustrating a flow of determining display or non-display the image object.

FIG. 11 is a view illustrating a flow for determining whether each image object is displayed or not displayed.

First, it is determined whether or not the lower end $Y_{nB}$ of the image object $Ob_n$ is below the upper end of the projection region of the real object (ST11).

In a case where $Y_{nB}<Y_T$ (ST11: YES) is satisfied and the dominant hand is the right hand (ST12: right), it is determined whether or not the left end $X_{nL}$ of the image object is on the right side of the left end $X_L$ of the real object (=the tip position of the writing instrument) (ST13). Here, in a case where $X_{nL}>X_L$ is satisfied (ST13: YES), non-display is determined (ST15). On the other hand, in a case where $X_{nL}>X_L$ is not satisfied (ST13: NO), display is determined (ST16).

In a case where $Y_{nB}<Y_T$ is satisfied (ST11: YES) and the dominant hand is the left hand (ST12: left), it is determined whether or not the right end $X_{nR}$ of the image object is on the left side of the right end $X_R$ of the real object (=the tip position of the writing instrument) (ST14). Here, in a case where $X_{nR}<X_R$ (ST14: YES), non-display is determined (ST15). On the other hand, in a case where $X_{nR}<X_R$ is not satisfied (ST13: NO), display is determined (ST15).

On the other hand, in a case where $Y_{nB}<Y_T$ is not satisfied (ST11: NO), display is determined (ST16).

For the respective image objects, display or non-display is determined along the above flow, and an image object to be non-displayed is specified.

Although the image display control unit 35, for example, as described above, has an overlap with the projection region of the real object 70 on the writing surface 12, the non-display processed image 101 in which an image object that does not overlap with the tip 74P of the writing instrument 74 is not displayed is created, and a mirror image of the non-display processed image is displayed on the image display surface 32.

Figure 12:
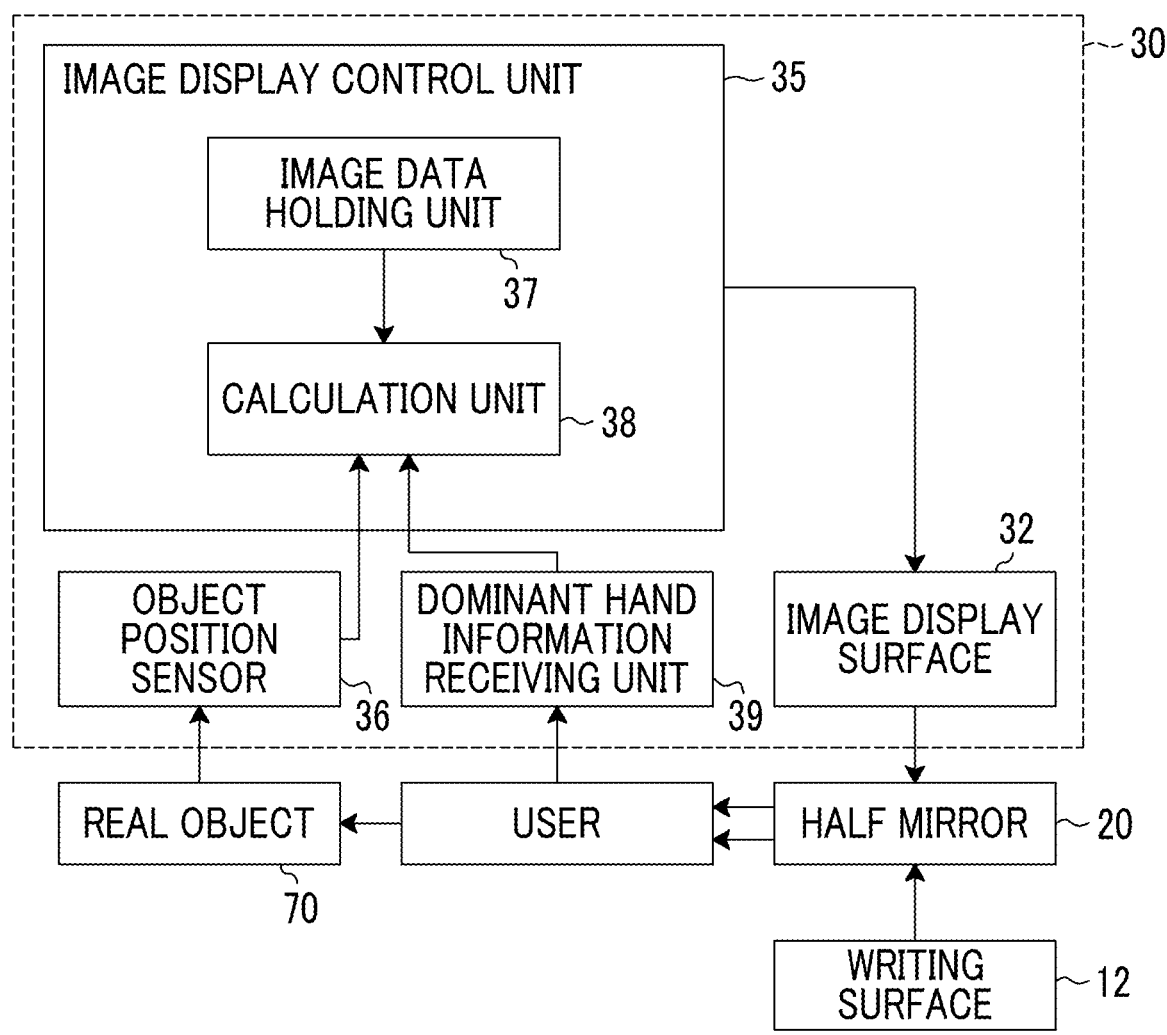
FIG. 12 is a view illustrating a design change example of a calculation block diagram.

In addition, in the above description, the image display control unit 35 specifies the left and right of the hand holding the writing instrument. However, the information of the dominant hand of the user may be specified in advance by the user. FIG. 12 is a block diagram of a design change example of the image display control unit 35 and other components that constitute the handwriting support device 1. The configuration differs from that illustrated in FIG. 5 only in that a dominant hand information receiving unit 39 is provided. The dominant hand information receiving unit 39 can be realized by, for example, a touch panel of the tablet computer.

Since the user inputs the dominant hand information, the image display control unit 35 does not need to implement the flow of specifying the left and right of the hand 76 holding the writing instrument 74. Therefore, faster processing can be performed.

The image display control unit 35 may be configured to cause a second image different from the first image to be further displayed on the image display surface 32 to overlap the first image. The second image is, for example, a guide image indicating the content to be described in an entry region.

A method of causing a guide image 122 relating to information such as a "recipient name" to be entered to be displayed as the second image will be described with reference to FIG. 13.

Figure 13:
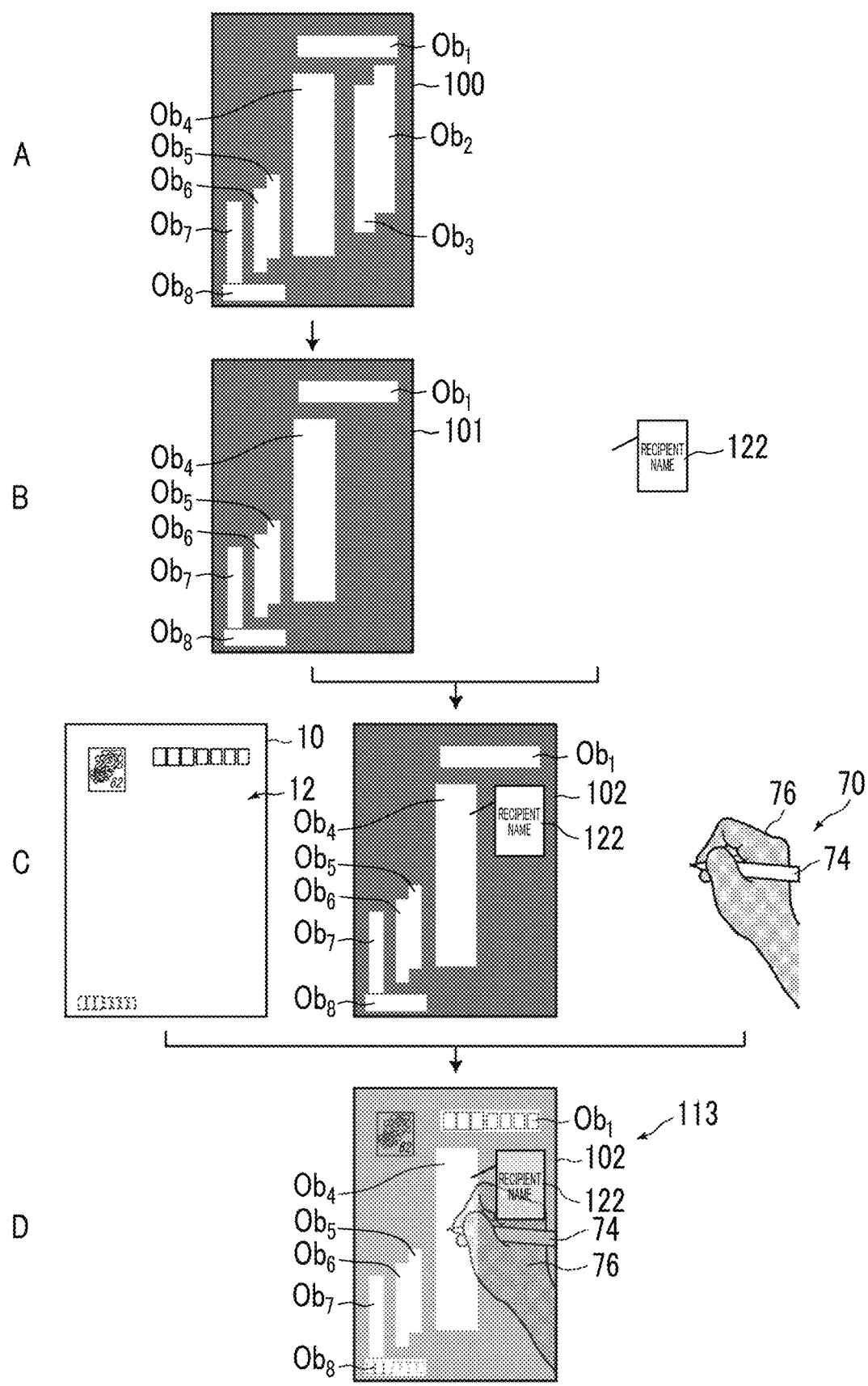
FIG. 13 is a view for explaining an image display method in a case here a second image is overlappingly displayed on a first image.

In the layout image 100 illustrated in A of FIG. 13, the non-display processed image 101 illustrated in B of FIG. 13 is created in the same manner as in the above embodiment. An image object of a region to be entered by the user is specified from the positional information of the tip 74P of the writing instrument 74 specified in a case of creating the non-display processed image 101. Specifically, the image object $Ob_4$ with which the tip 74P of the writing instrument 74 overlaps is specified as an image object to be entered. Then, information on the image object $Ob_4$, for example, the guide image 122 indicating an item to be entered is selected as the second image. An overlay image 102 obtained by overlapping the guide image 122 on an upper layer of the non-display processed image 101 is created.

Then, as illustrated in C of FIG. 13, in a case where the hand 76 holding the writing instrument 74 is inserted onto the writing surface 12, the user views the guide image 122 such that the guide image partially overlap with the hand 76, as in a visual field image 113 illustrated in D of FIG. 13. Also in this case, the user can recognize that the hand 76 is positioned on each of the image objects $Ob_1$ and $Ob_4$ to $Ob_8$, which is displayed to coincide with the writing surface 12. Moreover, since the content to be entered can be immediately understood from the guide image 122, the work can be efficiently performed. In addition, the guide image 122 may be displayed in a region different from the region of a non-displayed image object. However, as the guide image 122 overlaps with the hand and is recognized to be present in front of the hand, the user can be caused to feel that the non-display processed image 101 including the layout image is present behind the hand, and this is preferable because the effect of reducing the sense of discomfort is further enhanced.

In addition, in a case where the display region is small as in the guide image 122 indicating the "recipient name", and can be displayed in a region where no image object is present in the non-display processed image 101, a synthesized image in which the guide image 122 is synthesized with the layout image 100 may be created, and the synthesized image may be displayed on the image display surface 32.

Figure 14:
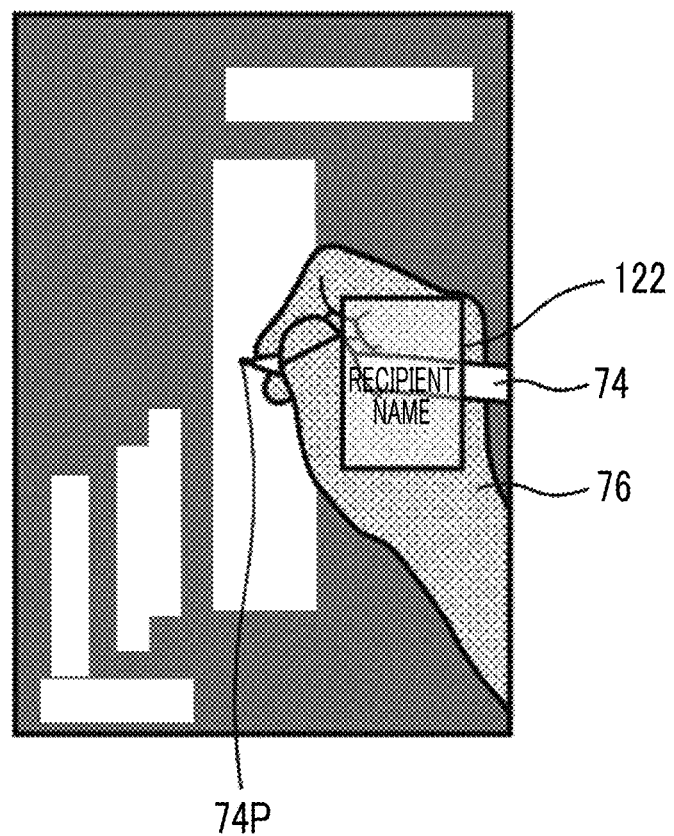
FIG. 14 is a view illustrating a state of the writing surface viewed from the user in a case where the second image is overlappingly displayed on a hand.

Moreover, as illustrated in FIG. 14, the entire region of the guide image 122 may be displayed on the surface of the hand. Since the guide image 122 does not overlap with the layout image, it is easier to perceive that the layout image is positioned behind the real object 70, and the guide image 122 is positioned in front of the real object 70, so that the discomfort in the depth perception can be further eliminated.

In addition, the guide image 122 for writing the cover of a postcard includes, for example, an "address", a "zip code", and the like in addition to the "recipient name". The image data are also stored in the image data holding unit 37, and the calculation unit 38 can read and display appropriate guide image depending on the position of the tip of the writing instrument on the writing surface.

As described in the above embodiment, in the image displayed on the writing surface including the plurality of image objects, display and non-display of the image objects are controlled depending on the position of the real object. Thus, there is no need to perform complicated image processing, the processing speed of the non-display processed image can be extremely increased, and even in a case where the real object moves, use with no discomfort can be achieved.

In the above-described embodiment, a configuration has been described in which the image presentation body 30 is constituted by a tablet computer and includes the image display control unit 35. However, the image presentation body 30 may be configured by a simple display that does not include a computer. In that case, the image presentation body 30 may be configured to be connected wirelessly or by wire to a separate computer on which the image display control unit is mounted.

Examples of the first image include, for example, the layout or grids of a character surface (back surface) of a letter or a postcard, the navigator of a good hand, a drawing frame, and the layout of an entry document at a public office or a bank in addition to the recipient name surface (front surface) of the above-described postcard.

In addition, the handwriting support device of the embodiment of the present invention is applicable to surgery support, surgery education, assembly work support, experimental work support, and the like in addition to the paperwork support.

EXAMPLES

Hereinafter, examples and comparative examples will be described.

In the examples and the comparative examples, in the device illustrated in FIG. 1, the object position sensor was a camera, and the distance from the object position sensor to the writing surface was approximately 300 mm. A recipient name writing surface of the postcard was positioned on the writing surface, and a layout image indicating entry positions of an address, a recipient name, and the like was used as the first image. The height of a user's hand (back) that is a real object was approximately 50 mm. The position of presence of the hand was determined from RGB information (image data) acquired by the camera. The respective examples and the comparative examples are different in the operation of the image display control unit within the handwriting support device.

Example 1

In the above embodiment, according to the method described with reference to FIGS. 6 and 7, the non-display processed image 101 in which the image object, which overlaps with the projection region of the hand and the writing instrument as the real object and does not overlap with the tip of the writing instrument, in the layout image is not displayed was displayed on the writing surface (refer to FIG. 7). Accordingly, the visual field image 112 illustrated in FIG. 7C was visually recognized by the user.

Example 2

In the above embodiment, according to the method described with reference to FIG. 13, the guide image for displaying the content to be written was overlappingly displayed on the non-display processed image 101 of Example 1 depending on the position of the hand on the writing surface. Accordingly, the visual field image 113 in which the guide image 122 illustrated in D of FIG. 13 partially overlaps with the hand was visually recognized by the user.

Comparative Example 1

Even in a case where the real object 70 was inserted onto the writing surface, the layout image 100 was displayed as it was without the non-display processing. That is, the layout image 100 was viewed to overlap with the hand as in the visual field image 111 illustrated in B of FIG. 6.

Comparative Example 2

Figure 15:
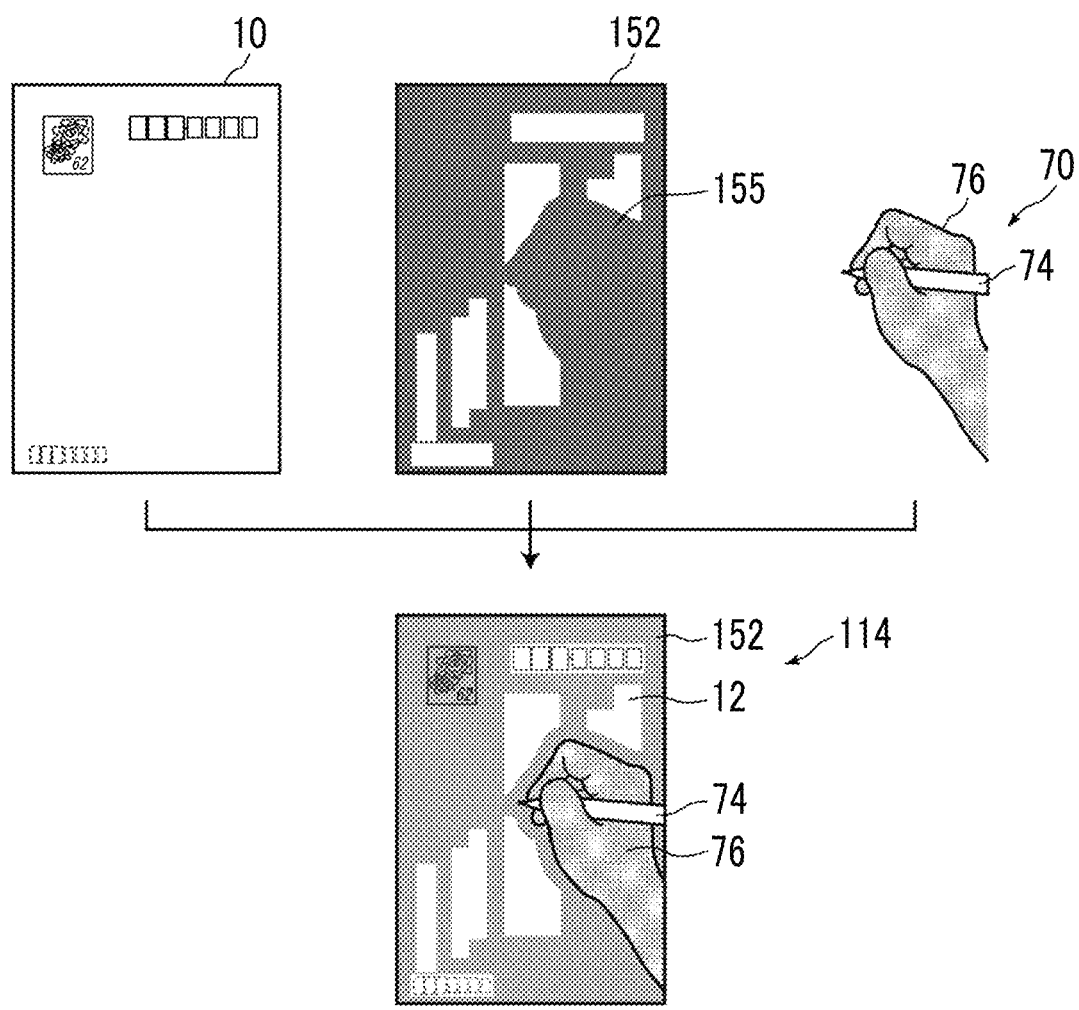
FIG. 15 is a view for explaining a state of the writing surface viewed from the user in a display method of Comparative Example 2.

As illustrated in FIG. 15, a contour of a region corresponding to the projection region of the real object 70 overlapping with the layout image was extracted, and a non-display processed image 152 in which a region 155 wider than this contour is non-display processed was created and was displayed on the image display surface. Accordingly, as illustrated in FIG. 15, an image in which a region wider than the projection region of the real object is not displayed was displayed on the writing surface. In this case, in a visual field image 114 by the user, the non-display processed image 152 was visually recognized behind the hand 76 of the user and the region where the image was not displayed around the hand 76 by the non-display processing was spread to a range wider than the hand 76. Thus, the shadow of the hand 76 was observed to be displayed.

In the display methods of Examples 1 and 2 and Comparative Examples 1 and 2, the usability by the user was compared with each other. Tests were performed in which 20 people were caused to write their recipient names on surfaces of postcards in a state where the display methods of the respective examples were displayed in random order, and the following evaluations were performed.

<Time Taken to Enter Recipient Name>

The time (seconds) from the start of writing to the end thereof was measured.

<Amount of Shift from Center of Recipient Name>

The sum (mm) of the amount shifted laterally from the layout center of the recipient name character gravity center was obtained.

<Naturalness of Experience to Enter Recipient Name>

Test subjects were surveyed in five stages from Unnatural 1 to Natural 5. Sensory evaluation was performed.

Average values of evaluation results for the respective examples are illustrated in Table 1.

TABLE 1

|  | Comparative Example 1 | Comparative Example 2 | Example 1 | Example 2 |
|---|---|---|---|---|
| Time (s) | 121 | 116 | 103 | 105 |
| Shift Amount (mm) | 2.7 | 3.8 | 2.9 | 3 |
| Naturalness | 2.5 | 4.5 | 5 | 5 |

As illustrated in Table 1, the entry times of Examples 1 and 2 was shorter than those of Comparative Examples 1 and 2. Additionally, compared to Comparative Example 1, evaluation results that there was less discomfort in the depth were obtained in Examples 1 and 2. In Comparative Example 2, there was no discomfort in the depth, but the amount of shift from the center was larger than in the examples. This is considered to be influenced by the missing of some information in the layout. In addition, since the methods of Examples 1 and 2 has a smaller calculation load compared to the processing of extracting the contour of the projection region of the real object and performing the non-display processing on the region wider than the contour to displaying the non-display processed image as in Comparative Example 2, the non-display processed image following the movement of the hand could be displayed. For that reason, it is considered that higher evaluation results were obtained in Examples 1 and 2 than in Comparative Example 2 in the evaluation of the naturalness of the experience.

The disclosure of Japanese Patent Application No. 2018-008813 filed on Jan. 23, 2018 is incorporated in the present specification by reference in its entirety.

All literatures, patent applications, and technical standards described in the present specification are incorporated in the present specification by reference to the same extent as in a case where the individual literatures, patent applications, and technical standards are specifically and individually stated to be incorporated by reference.

What is claimed is:

1. A handwriting support device comprising:
   a beam splitter that reflects light from an image display surface such that a virtual image of an image displayed on the image display surface is visible on a writing surface facing the image display surface and transmits the light from a writing surface side such that the writing surface side is visible, and that is disposed with a space between the beam splitter and the writing surface;

a memory; and a processor that is coupled to the memory, the processor being configured to perform control for non-display of an image object, which overlaps with a real object on the writing surface and does not overlap with a tip of a writing instrument, among a plurality of image objects in a case in which a first image including the plurality of image objects indicating writing target regions is displayed on the image display surface and the real object including the writing instrument is inserted into the space between the beam splitter and the writing surface;

wherein the handwriting support device further comprises an object position sensor that acquires image data of the real object on the writing surface, and wherein the processor is configured to specify the image object to be non-displayed, based on coordinate information of the real object on the writing surface that is obtained from the image data acquired by the object position sensor and coordinate information of each image object provided in advance.

2. The handwriting support device according to claim 1, wherein, in a case in which the real object is the writing instrument and a hand of a user that holds the writing instrument, the processor is configured to specify the image object to be non-displayed, based on information indicating left and right of the hand of the user and a tip position of the writing instrument, which is specified from the coordinate information of the real object on the writing surface, and the coordinate information of each image object.

3. The handwriting support device according to claim 2, wherein the processor is configured to:

acquire position coordinates of an upper end, a lower end, a left end and/or a right end of a projection region of the real object on the writing surface, as the coordinate information of the real object on the writing surface, specify an image object, having a lower end below the upper end of the projection region of the real object on the writing surface and having a left end on a right side of the tip position of the writing instrument, as the image object to be non-displayed, in a case in which the hand of the user is a right hand, and specify an image object, having a lower end below the upper end of the projection region of the real object on the writing surface and having a right end on a left side of the tip position, as the image object to be non-displayed, in a case in which the hand of the user is a left hand.

4. The handwriting support device according to claim 3, wherein the processor is configured to:

set the left end of the projection region of the real object as the tip position of the writing instrument in a case in which the hand of the user is a right hand, and set the right end of the projection region of the real object as the tip position of the writing instrument in a case in which the hand of the user is a left hand.

5. The handwriting support device according to claim 1, further comprising a dominant hand information receiving unit that receives dominant hand information from a user, wherein, in a case in which the real object is the writing instrument and a hand of a user that holds the writing instrument, the processor is configured to specify the image object to be non-displayed, based on information indicating a tip position of the writing instrument, which is specified based on the dominant hand information and the coordinate information of the real object on the writing surface, and the coordinate information of each image object.

6. The handwriting support device according to claim 1, wherein the processor is configured to display a second image that is different from the first image on the image display surface so as to overlap with the first image.

7. The handwriting support device according to claim 6, wherein the processor is configured to display, as the second image, information related to an image object which overlaps with the tip of the writing instrument on a display region of the image object to be non-displayed of the first image.

* * * * *

UNITED STATES PATENT AND TRADEMARK OFFICE
CERTIFICATE OF CORRECTION

| | | |
|---|---|---|
| PATENT NO. | : 11,222,563 B2 | Page 1 of 1 |
| APPLICATION NO. | : 16/929099 | |
| DATED | : January 11, 2022 | |
| INVENTOR(S) | : Takahiro Sano and Masayuki Naya | |

It is certified that error appears in the above-identified patent and that said Letters Patent is hereby corrected as shown below:

On the Title Page

Item (74), the firm name is incorrectly shown as "SOLARIS International Property group, PLLC."
Should be: "SOLARIS Intellectual Property Group, PLLC."

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*